United States Patent [19]

Luck et al.

[11] 4,102,851

[45] Jul. 25, 1978

[54] ALUMINA-THICKENED CYCLOALIPHATIC EPOXY MATERIALS FOR USE IN ATMOSPHERES OF ARCED SULFUR HEXAFLUORIDE AND ARTICLES THEREOF

[75] Inventors: Russell M. Luck, Monroeville; Gordon C. Gainer, Penn Hills, both of Pa.

[73] Assignee: Westinghouse Electric Corp., Pittsburgh, Pa.

[21] Appl. No.: 780,146

[22] Filed: Mar. 22, 1977

[51] Int. Cl.$^2$ ............................................. C08L 63/00
[52] U.S. Cl. .............................. 260/37 EP; 252/63.5; 252/64; 335/6
[58] Field of Search .................. 260/37 EP; 252/63.5, 252/64

[56] References Cited

U.S. PATENT DOCUMENTS

| | | | |
|---|---|---|---|
| 3,551,551 | 12/1970 | Hugi | 252/63.5 |
| 3,817,906 | 6/1974 | Tsukioka et al. | 260/37 EP |
| 3,828,000 | 8/1974 | Luck et al. | 260/37 EP |

*Primary Examiner*—Lewis T. Jacobs
*Attorney, Agent, or Firm*—D. P. Cillo

[57] ABSTRACT

Reliability of power circuit breakers and other equipment containing parts subjected to an environment of arced sulfur hexafluoride is improved by using a cycloaliphatic epoxy resin filled with aluminum trihydrate and thickened with finely divided, highly dispersed aluminum oxide (alumina).

18 Claims, No Drawings

ALUMINA-THICKENED CYCLOALIPHATIC EPOXY MATERIALS FOR USE IN ATMOSPHERES OF ARCED SULFUR HEXAFLUORIDE AND ARTICLES THEREOF

BACKGROUND OF THE INVENTION

1. Field of the Invention

This invention relates to synthetic-resin materials in the nature of a cycloaliphatic epoxy resin provided with an aluminum trihydrate filler and finely divided, highly dispersed aluminum oxide (alumina) thickener and having both excellent chemical resistance in an environment of arced gaseous sulfur hexafluoride and excellent "arc and track resistance", i.e., resistance to degradation as a result of the passage of an electric current arc along or upon surfaces of objects made of such material, in one environment of $SF_6$ gas and especially degradation of the kind whereby there is formed on the surface of the object a relatively low-resistance track of carbon. The invention further relates to the use of such materials in the making of parts that, when used, are subjected to an environment of arced sulfur hexafluoride, such as parts on extra-high-voltage power circuit breakers. The invention also relates to articles of manufacture made of such material.

2. Description of the Prior Art

To persons skilled in the art of the transmission of electrical power at high voltages, it is known to provide the transmission lines with power circuit breakers. These are structures of substantial size, being on the order of 10-20 feet tall and having, in the vicinity of their tops, electrically insulated and supported contacts that may be rapidly opened whenever an overload or fault occurs on the transmission line being protected by such breaker. With three-phase alternating current at a voltage on the order of 750 kilovolts, it is customary to use a set of three breakers, one for each phase. When the contacts of such a power circuit breaker are opened, an arc results, and it is naturally desirable that the arc be extinguished as quickly as possible in order to avoid damage to the circuit breaker. Moreover, with voltages as high as indicated above, the arc may be several inches long, or even as long as a few feet.

It is also known that one desirable attribute of a power circuit breaker is extremely high reliability. If a power circuit breaker fails to operate, there may be serious consequences at the site of the cause of the overload, at the site where the power is being generated, at the site of the circuit breaker, or elsewhere in the system. In the design and construction of power circuit breakers known to those skilled in the art, it has not been customary to spare expense, since the cost of the circuit breaker is small in comparison with that of the power generating and transmitting equipment that it protects.

In about the last ten years, it has become customary in certain designs to provide the contact area of a power circuit breaker with a flow of sulfur hexafluoride. Sulfur hexafluoride is a gas at room temperature and atmospheric pressure, and it is chemically rather inactive. It has a dielectric value substantially higher than that of air, so that an electric arc therein not only tends to be smaller, i.e., more filamentary, but also to decay and be extinguished substantially more rapidly. However, an electric arc causes degradation of sulfur hexafluoride into chemical entities that are extremely reactive, such as positively or negatively charged fluorine atoms and the like. These chemical entities are capable of abstracting hydrogen from molecules having an O—H bond or other active hydrogens, to form hydrogen fluoride, which is extremely reactive to many insulating materials. The reactivity of arced sulfur hexafluoride is aggravated by the presence of moisture, and moisture cannot always be completely excluded from the vicinity of the contacts of a power circuit breaker.

In building power circuit breakers of the kind protected with sulfur hexafluoride, it has been customary to lead the $SF_6$ gas from a compressor and high-pressure reservoir through a feed tube, wherein the $SF_6$ gas is under pressure of about 250 pounds per square inch, to the vicinity of the contacts, where $SF_6$ gas is maintained at a lower pressure such as 50 pounds per square inch. The feed tube may be visualized as a simple cylindrical tube, about 12 feet long, 3 inches in outside diameter, and ¼ inch in wall thickness. Prior to the present invention, it has been customary to make such feed tubes by coating a sheet of paper on one or both sides with phenolic resin and rolling the paper to form the feed tube. The paper provides the strength required for containing the high-pressure $SF_6$ gas. To obtain the required strength without internal reinforcement of the resin would require the use of impractically large wall thicknesses.

Epoxy resins of various kinds are known, including ones based upon a backbone structure comprising a pair of cycloaliphatic rings joined by a bridge comprising, for example, an ether, ester or other linkage. Although it is known that epoxy resins do, in general, have desirable properties as respects strength, dielectric constant, and resistance to chemical media ordinarily encountered, the reactivity of arced $SF_6$ gas is so high that many other substances, considered just as unreactive in the ordinary run of chemical media encountered, have failed in an atmosphere of arced $SF_6$ gas. For example, arced $SF_6$ gas attacks silica, porcelain and glass. As experience with phenolic paper feed tubes in power circuit breakers demonstrates, arced $SF_6$ also attacks phenolic resin, at least to some extent.

The development of a satisfactory feed tube for use in power circuit breakers of the kind using $SF_6$ involves more than finding a material that is chemically resistant to the reactive entities present in arced $SF_6$. A resinous material for this purpose must also be reasonably convenient to handle and cure, and it must also possess adequate arc and track resistance.

It is also known that the feed tubes of power circuit breakers may, in use, be subjected to considerable variations in temperature, such as from minus 30° l C to 140° C. Such temperature changes cause expansion and contraction, and since the resin must be strengthened, as mentioned above, by incorporating or embedding therein a strengthening member of different material, whose coefficient of expansion cannot be matched with that of the resin, there is a further requirement that the composition used exhibit satisfactory flexibility.

A further requirement of a suitable composition of matter for the above-indicated purpose is that it be sufficiently thixotropic. No known resin, unmodified, would suitably resist run-off and sagging and give the desired high and uniform build that is required in compositions for feed tubes and related purposes. Most of the known thixotropic agents, however, such as very finely divided silica, are subject to attack by arced $SF_6$ and would be expected, therefore, to be unsuitable.

All of the above-mentioned problems were completely solved and all of the requirements met by Luck and Gainer, in the compositions taught in U.S. Pat. No. 3,828,000, which used a cycloaliphatic epoxy resin filled with aluminum trihydrate and thickened with a highly refined short fiber Coalinga asbestos.

However, the use of asbestos-containing materials has been severely curtailed in industry because of health hazards associated around possible lung injestion of asbestos particles, and because of the strict requirements now established by the Occupational Safety and Health Administration of the U.S. Government. What is needed then is a substitute material for asbestos, possessing equally unique thixotropic and $SF_6$ resistant properties.

SUMMARY OF THE INVENTION

We have found that, in accordance with the invention, the above-indicated problems are overcome by providing a composition of matter that comprises, as essential components, the following: (A) an epoxy resin of the kind having a backbone structure characterized by at least one, and preferably two substantially cycloaliphatic rings, and in the case of structures comprising a pair of rings and having a bridge therebetween, preferably a resin of the kind having not more than about 5 atoms in the direct chain from one ring to the other; (B) a flexibilizing agent comprising polyazelaic polyanhydride, alone or with hexahydrophthalic anhydride; (C) a filler promoting arc and track resistance, such as aluminum trihydrate or naturally occurring magnesite; and (D) finely divided aluminum oxide (alumina $Al_2O_3$) particles having a large surface area and an average particle size range of between about 0.5 milli-micron (m$\mu$) to about 100 milli-microns (m$\mu$) diameter, as a thixotriping agent. When the above components are mixed, for example, in such proportions as 100 parts by weight of resin, about 100 parts by weight of polyazelaic polyanhydride, about 200 parts by weight of aluminum trihydrate and about 10 parts to about 75 parts by weight of alumina, alone or with a suitable catalyst or accelerator, there is obtained a viscous liquid that can advantageously be used, as herein taught, to serve the purposes and overcome the problems indicated above.

More particularly, this viscous liquid itself or tinned with suitable organic solvents, is applied to objects and cured. A particular example involves making a power circuit breaker feed tube by applying the viscous liquid of this invention to a mandrel, causing it to cure, wrapping resin-wet glass fiber therearound, curing, grinding the outside diameter to size, applying additional amounts of the viscous liquid to the sized exterior, and again curing. Alternatively, a feed tube is made by wrapping glass fiber wet or impregnated with the partially cured, viscous liquid on a mandrel, curing grinding to size, removing the mandrel, and applying the viscous liquid to the interior and exterior of the glass fiber tube so formed, as by spraying, brushing, dipping or casting.

Other applications of this composition can include lining materials for $SF_6$-filled power circuit breakers, coatings to protect high voltage epoxy post or other insulators which are used as insulating conductor support structures in $SF_6$-filled gas insulated high voltage and/or transmission systems and as protective coating compositions for glass cloth epoxy and other type circuit boards and insulator structures.

DESCRIPTION OF THE PREFERRED EMBODIMENTS

In accordance with the invention, there is compounded a composition of matter comprising an appropriate resin, a flexibilizing agent, a filler, and high surface area, finely divided, highly dispersed alumina (Al$_2$O$_3$) as thickener or thixotroping agent. The mixture may also contain, if desired, a catalyst or a reaction accelerator that participates in the curing reaction. Those skilled in the art will appreciate that the above-mentioned components may be used in different amounts and proportions, depending upon the properties desired and the particular components selected.

The epoxy resin selected is substantially cycloaliphatic and is preferably of the kind having a backbone structure comprising a pair of cycloaliphatic rings joined by a bridge, with epoxy oxygen atoms disposed between vicinal ones of the carbon atoms comprising the cycloaliphatic rings. The cycloaliphatic resins are used in place of the other known kinds of epoxy resins, such as the ones of aromatic character, based upon a bisphenol, or the epoxidized novalac resins. The resins of cycloaliphatic character appear to yield compositions having the desired flexibility, chemical inertness, and resistance to surface arcing, whereas tests with epoxy resins of the other kinds mentioned above, or with other synthetic resins, tended generally to yield results that were deficient with respect to one or more of the above-mentioned properties. For example, bisphenol-type epoxy resins were tried, but these lacked, because of their aromatic nature, the desired high order of arc and track resistance in moist high-pressure $SF_6$. The novolac epoxy resins were sufficiently chemically resistant, but they were also deficient in arc and track resistance in moist $SF_6$. Polyesters, such as polyethylene terephthalate, were not sufficiently chemically resistant to arced $SF_6$. The same was true of the polyurethanes and the polyamides that were investigated. The silicone rubbers and resins were investigated, but these were very poor in chemical resistance to arced $SF_6$. The polyphenylene oxide resins had adequate chemical resistance, but failed in the arc and track test. The polyolefins, such as polyethylene and polypropylene, proved satisfactory in both chemical resistance and arc and track resistance, but only when care was taken to produce a composition free of harmful catalyst and stabilizer. Moreover, these materials are difficult to use for the purposes of the invention, since it is not easy to form and cure a coating based upon them that also contains the other desired ingredients. They are also undesirable as they are thermoplastic, i.e., are heat-meltable.

Applicants are aware of at least two kinds of cycloaliphatic epoxy resins that are now commercially available, and of these, one having a backbone structure that comprises two cycloaliphatic rings joined by a bridge structure of

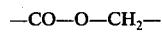

appears to give superior results in resistance to arced $SF_6$ in comparison with those obtained with the other, which has a bridge structure of

That is to say, the resin with the shorter bridge structure appears to be preferable, being less flexible and therefore less subject to permeation by active chemical entities existing in arced $SF_6$. Thus, it may be said that in the practice of the invention, it is preferred that there be used a cycloaliphatic epoxy resin that has a bridge between its rings that does not contain more than about 5 atoms in the direct chain between said rings.

To be more precise, a preferred kind of cycloaliphatic epoxy resin suitable for use in practicing the present invention is that having the backbone structure

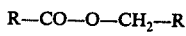

where R is a cycloaliphatic ring, preferably but not necessarily a 6-membered aliphatic ring, having an epoxy oxygen atom connected to a pair of vicinal carbon atoms thereof, with a viscosity at 25° C of 350 cps. to 450 cps. and an epoxide equivalent weight of 126 to 140. Such resin is sold by Union Carbide Chemical Co. under the mark "ERLA 4221," and by Ciba Chemical Co. under the mark "CY-179."

Another resin satisfactory for the practice of the invention is that having a backbone structure of

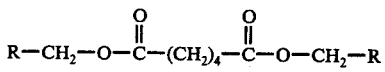

where R is a methylated 6-membered cycloaliphatic ring having an epoxy oxygen connected to a pair of vicinal carbon atoms thereof, with an epoxide equivalent weight of about 120 to 150. Such resin is sold by Union Carbide Chemical Co. under the mark "ERLA 4289," and by Ciba Chemical Co. under the mark "CY-178."

There are other compositions that have been tried that exhibit satisfactory results and comprise substantially cycloaliphatic resins other than those mentioned specifically above.

There may also be used, for example, an epoxy resin based upon a diepoxide of the structure

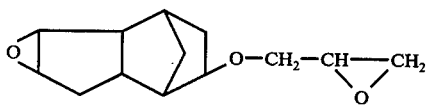

which may be designated 2,3-epoxy cyclopentane-4,7-endomethylene cyclohexane-6-glycidyl ether. Such resin is sold by Ciba Chemical Co. under the mark "CY-181."

There is also the diglycidyl ester of tetrahydrophthalate anhydride, the compound

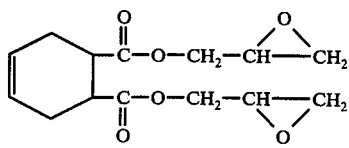

which is sold by Ciba Chemical Co. under the mark "CY-182" and by Union Carbide Chemical Co. under the mark "ERX-49" and constitutes a different epoxy-resin monomer useful in the practice of the invention.

There is, moreover, the resin based upon the diglycidyl ether having the formula

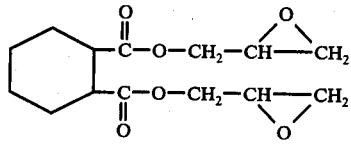

i.e., the diglycidyl ether of hexahydrophthalic anhydride. Such ether is sold by Ciba Chemical Co. under the mark "CY-183" and by Union Carbide Chemical Co. under the mark "ERRA-4090."

Other resin monomers useful in the present invention are those based upon the reaction product of epichlorohydrin with hydrogenated bisphenol-A, i.e., a compound of the formula

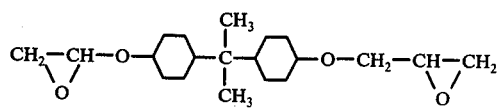

Such monomer is sold by Ciba Chemical Co. under the mark "CY-185."

Yet another epoxy-resin monomers useful in the practice of the present invention are thosed based upon the diglycidyl ether.

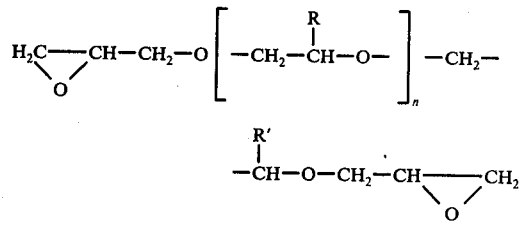

where $n$ = an integer from about 4 to 30; and R and R' are lower alkyl radicals such as $C_1$ to $C_4$. Such monomers are sold by Ciba Chemical Co. under the mark "Araldite 508" and by Dow Chemical. Co. under the mark "DER-732." Though chemically similar and generally capable of being substituted for each other, the two above-mentioned commercial products differ somewhat, their room temperature viscosities being 2,500 cps. to 5,000 cps. and 50 to 100 cps., respectively.

Still other epoxy-resin monomers useful in the practice of the present invention comprises the di-(epoxy cyclopentane) ethers of the kind that are sold by Union Carbide Chemical Co. under the mark "ERRA-4205." These comprise an isomeric mixture of such epoxy cyclopentane ethers, one of which has the formula

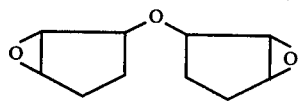

One hundred parts by weight of such resin are mixed with further ingredients as mentioned below.

The composition further contains about 30 to 150 parts by weight per 100 parts of resin, of a flexibilizing agent comprising polyazelaic polyanhydride preferably having a molecular weight of 2,100 to 2,500 and/or hexahydrophthalic anhydride. There may be used, for example, 75 parts by weight of the polyazelaic polyanhydride; or 60 parts by weight of the polyazelaic polyanhydride and 10 or 15 parts of the hexahydrophthalic anhydride. As a flexibilizing agent, the latter is less effective than the former. When the composition lacks an adequate proportion of effective flexibility agent, cracking develops when the cured composition coated on, for example, filament-wound-glass epoxy structures, is subjected to a thermal cycling test. On the other hand, compositions that contain too great an amount of flexibilizing agent, while satisfactory in the thermal cycling test, tend to exhibit poor or unsatisfactory results in a chemical attack test comprising exposure to arced $SF_6$ gas. In some instances, especially when the base resin is itself particularly flexible hexahydrophthalic acid may be used alone, but in most instances, about 70 to 115 parts of the polyazelaic anhyride per 100 parts of resin are needed to obtain adequate flexibility to pass the thermal cycling test hereinafter described.

The composition further comprises aluminum trihydrate ($Al_2O_3 \cdot 3H_2O$) or naturally occurring magnesite ($MgCO_3$) or their mixtures preferably the former, for use solely as a filler promoting arc and track resistance in moist $SF_6$ gas. There may be used, per 100 parts of resin, about 120 to about 250 parts by weight of such material having average particle size of between about 0.5 micron and about 450 microns. No substitute for such material, for the purposes of this invention, is known. Without it, the arc and track resistance in moist $SF_6$ gas is poor. The trihydrate has the further attribute that it is sufficiently basic in character that, in addition to serving the purpose mentioned above, it also is capable when the mixture is subjected to curing conditions hereinafter mentioned, of promoting the usual intermolecular cross-linking between the epoxy oxygen atoms of the resin that characterizes such curing. Those skilled in the art of working with epoxy-resin compositions will appreciate that such curing is customarily promoted with the use of an agent of fairly strongly acidic or basic character. When the magnesite is used, it becomes necessary to use, for one example, benzyldimethylamine as the catalyst to promote the curing reaction.

The composition further comprises from about 10 to about 75 parts of finely divided, highly dispersed aluminum oxide (alumina $Al_2O_3$) having an average particle size range of between about 0.5 milli-micron (0.0005 micron) and about 100 milli-microns (0.100 microns) diameter, preferably between about 2 milli-microns and about 50 milli-microns diameter, and a high area, used solely as a thixotroping agent. This is to be distinguished from aluminum tihydrate described above, which has a much larger particle size, a different chemistry, and serves a completely different function in this invention. In the invention, the use of a satisfactory thixotroping agent is absolutely essential. Without one, the filler tends to settle out when the composition is used for casting or potting, and when the composition is used for spray or dip casting, the thixotroping agent is needed in order to prevent most of the coating from dripping off the coated piece as soon as it is subjected to curing heat. Below about 0.5 milli-micron diameter, the thixotropic effect becomes too pronounced and coating is difficult. Over about 100 milli-microns diameter, the coating may tend to drip off the coated piece, especially when heating to cure the casting.

The usual surface area range for useful alumina materials for this invention is from about 40 sq.m/g to about 300 sq.m/g (BET) with a pH between about 3.5 to 9 (4% aqueous dispersion). This high surface area is believed to be partly responsible for the excellent thickening ability of this material. This material is usually made by the combustion of appropriate mixtures aluminum tri chloride, hydrogen and oxygen, to form in the resulting flame front an alumina fume or alumina soot-like material possessing extremely high surface area per unit weight.

The foregoing are the essential ingredients of the composition, but it may also contain others, such as catalysts, participating reaction accelerators, fireproofing agents, flame-retardants, dyes, pigments, or other coloring agents, etc.

As a catalyst for the curing reaction, if one is used, we prefer to use benzyldimethylamine. Most of the other known catalysts for curing epoxy resins have the drawback that they worsen the performance of the composition in arced $SF_6$ gas. We may use, for example, about 0.5 part to about 2 parts by weight of the amine per 100 parts of resin.

As a participating reaction accelerator, we may use in some instance a mixture of sodium alcoholate suspended in polyols, such as that sold by Ciba Chemical Co. under the mark "065." This material cannot be used when magnesite is used in place of aluminum trihydrate, since it reacts with the magnesite instead of with the resin molecules. When used with compositions containing aluminum trihydrate, the material is added in quantities of about 10 parts to about 15 parts by weight per 100 parts of resin.

The above ingredients are all thoroughly mixed at 50° C to 60° C in a flask or beaker. A viscous thixotropic liquid results. This may be used as such, or it may be thinned with an appropriate organic solvent, such as toluene, benzene, acetone, ethanol, petroleum ether, diethyl ether, or the like, depending upon the manner of intended use.

The use of the composition will be described with reference to the making of a feed tube for an extra-high-voltage power circuit breaker of the type utilizing $SF_6$ gas. Such tubes are cylindrical, about 3 inches in diameter and about 12 to 16 feet long, with a wall thickness of about ¼ to ½ inch. Embedded therein are filament wound reinforcing fibers such as rayon or cotton thread, glass cloth, polyester or aramid fibers, and the like. Those skilled in the art will understand, from the following description, how the composition would be used to make other objects for use in an environment of arced $SF_6$.

One way of making a feed tube is to wind the glass fiber, wetted with resin, onto a mandrel to form a tube, cure, withdraw the mandrel, grind the outside diameter to size, dip the tube into the composition, and then cure the composition, as by baking for 3.5 to 4.5 hours at 150° C. The dipping and baking may be repeated, if desired, to obtain a thicker coat of cured resin composition, but in most instances, this is not necessary.

Another way is to dilute the composition with solvent, warm it slightly, spray it onto the mold-release-coated mandrel, gel, wind the resin-wet glass filaments, cure, withdraw the mandrel, grind the outside diameter to size, spray the exterior of the tube with the composition, and cure.

Still another way is to proceed as described immediately above until there is obtained the coated and filament-wound mandrel, ready for the second spraying. Instead, the mandrel is removed and the tube is placed into a mold, preferably after grinding the outside diameter to size, and the composition is cast or molded into place on at least the exterior of the tube. The piece is then baked to effect the cure.

The invention described is illustrated by the specific examples hereinbelow, in connection with which there are given data resulting from certain tests, which will first be described in order that a complete understanding may be had of the significance of the data there presented.

In one test, hereinafter referred to as the thermal cycling test, a one-inch wide ring section of an epoxy glass filament wound tube ¼ to ½ inch thick is used. This tube section is coated with the test composition being evaluated. The sample is placed for 1 hour in a cold box where the temperature is −35° C, removed, then permitted to stand for 15 to 30 minutes at room temperature, and then placed for ½ hour in an oven at a temperature of 120° C, and then permitted to stand for 15 minutes at room temperature. A complete test comprises ten such cycles. The sample is examined for cracks in the coating in each cycle, just before it is placed into the oven. To be satisfactory, a sample must exhibit no cracks under a microscope, or when checked by other means.

Another test, hereinafter called the Arced $SF_6$ test, measures the resistance of the material to chemical attack by reactive entities present in an environment of arced $SF_6$. As the materials involved must be extremely resistant to such reactive entities, so as to be capable of withstanding exposure to such an environment for such long periods of time as 30 years, it is apparent that the test for the existence of chemical attack must be a highly sensitive one. Accordingly, there was used a test, working with, for example, a sample approximately 2 inches in diameter by ¼ to ⅛ inch thick, provided with concentric electrodes spaced 0.25 or 0.1 inch apart (this may conveniently be done by painting electrodes onto the sample piece, using silver paint) and mounted within an autoclave having an internal capacity of 300 cubic inches and provided with suitably spaced electrodes and with shielding means between those electrodes and the sample. The autoclave, with the sample mounted within it, is sparged with $SF_6$ gas, sealed, and then pressurized with dry (under 50 ppm. moisture) $SF_6$ gas. The contents of the autoclave are heated to 55° C, and then an arc is drawn between the electrodes to generate reactive entities within the pressurized (38 p.s.i.g.) $SF_6$ gas. The intensity of the electrical-arc treatment of the $SF_6$ gas is 80 kilowatt-seconds. Resistance measurements are taken across the above-mentioned gap of 0.25 to 0.1 inch at various times: First, one minute after to conclusion of the arcing, and then 24 hours later, when the test cell has been permitted to cool at room temperature, and a third time, after the test cell has again been heated to 55° C. The resistance values obtained are in megohms, and the lowest of the three readings is reported as the result of the test. Usually, this is the value from the first of the three readings. Although values of 500 megohms or higher may be considered satisfactory, it is preferred that the invention be practiced with materials that give values of 10,000 megohms or higher in this test.

Another test employed is the differential wet arc and track test, which is conducted in air, rather than in $SF_6$ gas. This test is ASTM Standard Test D-2302-64T.

Yet another test is the feed tube track test (FTTT). In this, a 3-inch long section of feed tube 3 inches in diameter, about 5/16 inch thick, is coated on its inside cylindrical surface with the test composition, and the ends of the feed tube section are then closed by means of inch-thick plates of polycarbonate resin containing proper openings and fittings. Electrodes made of 0.032-inch Nichrome wire are placed against the test surface, one inch apart. The tube is then positioned at an angle 45° with respect to the horizontal and is charged with $SF_6$ gas to 240 p.s.i.g. To the upper end of the tube, there is fed, at a rate of 0.02 cubic centimeter per minute, water that contains 0.1% of a non-ionic wetting agent and has a resistivity of 4 kilo-ohms per centimeter, this water flowing over the surface to "connect" the electrodes. After the water has flowed from one electrode to the other for 5 minutes, a 5 kilovolt potential is applied across the electrodes. Scintillations slowly start and play across the test surface. The test continues for 10 minutes, unless the test surface fails before that time, for example, by developing a carbon track or an overall electrical resistance low enough that the current between the electrodes rises to 20 milliamperes. In either event, the current will rise sufficiently to activate a relay set for 20 milliamperes. The results of this test are reported in number of seconds duration of test, with an indication of the instances in which a carbon track was observed on the failed test sample. A standard phenolic feed tube, i.e., one made in accordance with the prior art, fails in this test in less than 12 seconds, and on the average in less than 4 seconds, tracking being observed.

EXAMPLE

Examples of the practice of the invention are shown by Samples 1 and 2, containing finely divided alumina thixotroping agent ($Al_2O_3$ of about 5 milli-microns to 30 milli-microns ave. part. dia., a pH of 4–5, and 100 sq.m/g., (square meters/gram) surface area, sold as aluminum oxide-C pigment by Degussa Inc.); together with comparative results with a standard cycloaliphatic epoxy-asbestos tube, Sample 3; fused silica thixotroping agent ($SiO_2$ of about 0.015 micron ave. part. dia., a pH of 3.5 to 4.2, and 200 sq.m/g. surface area, sold as Cab-O-Sil M-5 by the Cabot Corp.), Sample 4, and titanium dioxide thixotroping agent ($TiO_2$ of 15 milli-microns to 40 milli-micron ave. part. dia., sold as titanium dioxide P-25 pigment by Degussa Inc.), Sample 5.

The ingredients were all mixed together at about 50° C in a flask and tested as described hereinabove. The results of those tests are described in Table 1 below:

TABLE 1

| Ingredients, parts/wt. | Samples | | | | |
|---|---|---|---|---|---|
| | 1 | 2 | 3 | 4 | 5 |
| Cycloaliphatic epoxy resin (ERLA 4221) | 100 | 100 | 100 | 100 | 100 |
| Hexahydrophthalic Anhydride | 15 | 15 | 15 | 15 | 15 |
| Polyazelaic Polyanhydride | 97 | 97 | 97 | 97 | 97 |
| alumina-trihydrate | 212 | 212 | 212 | 212 | 212 |
| $Al_2O_3$ | 24 | 40 | | | |
| $SiO_2$ (Cab-O-Sil M-5) | | | | 24 | |
| $TiO_2$ | | | | | 60 |

TABLE 1-continued

| | | | | | |
|---|---|---|---|---|---|
| asbestos | | | 6 | | |

| | Test Results | | | | |
|---|---|---|---|---|---|
| | Samples | | | | |
| Test | 1 | 2 | 3 | 4 | 5 |
| Arced SF$_6$, megohms | Infinite | Infinite | Infinite | 386 | — |
| ASTM D2301-64T | Excellent | Excellent | Excellent | Excellent | — |
| Thermal Cycling | Excellent | Excellent | Passed | Excellent | — |
| FTTT, seconds | 600 | 600 | 600 | 600 | 30, Tracked |
| Thixotropic Ability | Good | Good | Good | Good | Poor |

From the foregoing, it can be seen that finely divided Al$_2$O$_3$ Samples 1 and 2, provides an excellent substitute for asbestos, Sample 3, in an epoxy resin system. Also, as shown by Samples 4 and 5, many oxides are not suitable substitutes for asbestos, providing either poor resistance to arced SF$_6$, poor resistance to tracking or poor thixotropic qualities. Alumina possesses the unique properties possessed by asbestos, in providing all the qualities essential to its use as a thixotroping agent in SF$_6$ resistant cycloaliphatic coating compositions and for use as feed tubes in extra-high voltage circuit breakers. It has been shown that the especially high surface area characteristics of the finely divided Al$_2$O$_3$ has the unique ability to adsorb the resin on the surface and into its interstices. This is believed to be responsible for the excellent thickening properties obtained. This thickening agent is very effective not only at room temperature, but also at temperatures of about 120° to 150° C, where curing of the epoxy resin must be effected without runoff or sagging of the uncured, applied, "wet", liquid coating composition.

We claim as our invention:

1. Thixotropic compositions of matter consisting essentially of:
   (a) 100 parts by weight of a monomeric cycloaliphatic epoxy containing at least one cycloaliphatic ring,
   (b) about 30 to about 150 parts by weight of a flexibilizing agent selected from the group consisting of a polyazelaic polyanhydride, hexahydrophthalic anhydride and mixtures thereof,
   (c) about 120 to about 250 parts by weight of a material selected from the group consisting of aluminum trihydrate, naturally occurring magnesite and mixtures thereof acting as the filler, and
   (d) about 10 parts to about 75 parts by weight of Al$_2$O$_3$ having an average particle size of between about 0.0005 micron to about 0.10 micron, acting as the thixotroping agent, said thixotropic composition having chemical resistance to arced SF$_6$ upon cure.

2. Compositions as defined in claim 1 wherein the cycloaliphatic epoxy has the structure

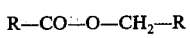

where R is a cycloaliphatic ring having an oxygen atom connected to a pair of vicinal carbon atoms thereof with a viscosity of 350 cps. to 450 cps. at 25° C and an epoxide equivalent weight of 126 to 140.

3. The composition of claim 1 wherein the flexibilizing agent is a mixture of the polyazelaic polyanhydride and hexahydrophthalic anhydride.

4. Compositions as defined in claim 1, characterized in that said cycloaliphatic epoxy is one having a backbone structure containing a pair of cycloaliphatic rings joined by a bridge, with epoxy oxygen atoms joined to vicinal carbon atoms comprising said rings.

5. Compositions as defined in claim 4, characterized in that said filler material is aluminum trihydrate and said thixotroping agent has a surface area of from about 40 sq.m/g to about 300 sq.m/g.

6. Compositions as defined in claim 4, characterized in that said epoxy has a backbone structure that contains a bridge containing not more than about 5 atoms in the direct chain between said rings and the filler which promotes arc and track resistance in moist SF$_6$ gas has an average particle size of between about 0.5 micron and about 450 microns.

7. Compositions as defined in claim 6, characterized in that said filler material is aluminum trihydrate and the sole thixotroping agent is Al$_2$O$_3$ having an average particle size of between about 0.002 microns to about 0.050 microns diameter.

8. An insulated article in an environment of SF$_6$ gas subject to arcing said article having a flexible insulating surface adapted to be exposed to said gas, said insulating surface consisting essentially of the cured reaction product of:
   (a) 100 parts by weight of a monomeric cycloaliphatic epoxy containing at least one cycloaliphatic ring,
   (b) about 30 to about 150 parts by weight of a flexibilizing agent selected from the group consisting of polyazelaic polyanhydride, hexahydrophthalic anhydride and mixtures thereof,
   (c) about 120 to about 250 parts by weight of a material selected from the group consisting of aluminum trihydrate, naturally occurring magnesite and mixtures thereof acting as the filler, promoting arc and track resistance in moist SF$_6$ gas, and
   (d) about 10 parts to about 75 parts by weight of Al$_2$O$_3$ having an average particle size of between about 0.0005 micron to about 0.10 micron, acting as the thixotroping agent, said insulating surface having chemical resistance to arced SF$_6$ and resistance to track degradation in an environment of SF$_6$.

9. The article of claim 8 wherein the cycloaliphatic epoxy has the structure R—CO—O—CH$_2$—R where R is a cycloaliphatic ring having an oxygen atom connected to a pair of vicinal carbon atoms thereof with a viscosity of 350 cps. to 450 cps. at 25° C and an epoxide equivalent weight of 126 to 140, and the filler has an average particle size of between about 0.5 micron and about 450 microns.

10. The article of claim 8 wherein the flexibilizing agent is a mixture of the polyazelaic polyanhydride and hexahydrophthalic anhydride.

11. An article as defined in claim 8, characterized in that said article comprises a part of an extra-high voltage circuit breaker.

12. An article as defined in claim 11, characterized in that said article is a feed tube.

13. An article as defined in claim 8, characterized in that, in the sole reaction product, said thixotroping agent has a surface area of from about 40 sq.m/g to about 300 sq.m/g and said filler material is aluminum trihydrate.

14. An article as defined in claim 8, characterized in that cycloaliphatic epoxy is one having a backbone structure containing a pair of cycloaliphatic rings joined by a bridge, with epoxy oxygen atoms joined to vicinal carbon atoms comprising said rings.

15. An article as defined in claim 14, characterized in that said epoxy has a backbone structure that contains a bridge containing not more than about 5 atoms in the direct chain between said rings.

16. An article as defined in claim 15, further characterized in that, in said reaction product, said filler material is aluminum trihydrate and said thixotroping agent is $Al_2O_3$ having an average particle size between about 0.002 microns to about 0.050 microns diameter.

17. An article as defined in claim 16, characterized in that said article comprises a part of an extra-high voltage circuit breaker.

18. An article as defined in claim 17, characterized in that said article is a feed tube.

* * * * *